United States Patent [19]

Mori et al.

[11] Patent Number: 4,461,807
[45] Date of Patent: Jul. 24, 1984

[54] RECORDING MATERIAL

[75] Inventors: Koichi Mori; Masafumi Nakao, both of Fuji, Japan

[73] Assignee: Asahi Kasei Kogyo Kabushiki Kaisha, Osaka, Japan

[21] Appl. No.: 527,201

[22] Filed: Aug. 29, 1983

Related U.S. Application Data

[63] Continuation of Ser. No. 285,415, Jul. 22, 1981, abandoned.

[30] Foreign Application Priority Data

Jul. 25, 1980 [JP] Japan .................... 55-102101
Aug. 11, 1980 [JP] Japan .................... 55-110054
Aug. 27, 1980 [JP] Japan .................... 55-118103

[51] Int. Cl.³ ........................ G01D 15/10
[52] U.S. Cl. ........................ 428/469; 346/76 L; 346/135.1; 428/209; 428/471; 428/472; 428/697; 428/699; 428/701; 428/913; 430/945
[58] Field of Search ................ 346/76 L, 135.1; 428/195, 209, 212, 213, 215–218, 457, 469, 471, 472, 689, 697, 699, 701, 913; 430/200, 348, 945, 964

[56] References Cited

U.S. PATENT DOCUMENTS

| | | |
|---|---|---|
| 3,560,499 | 2/1971 | Wolff et al. .................... 346/135.1 |
| 3,665,483 | 5/1972 | Becker et al. ................ 346/135.1 X |
| 3,990,084 | 11/1976 | Hamisch et al. ............... 430/945 X |
| 4,188,214 | 2/1980 | Kido et al. ........................ 430/945 |
| 4,268,575 | 5/1981 | Shinozaki .................. 346/135.1 X |
| 4,317,123 | 2/1982 | Namiki ...................... 346/135.1 X |
| 4,335,198 | 6/1982 | Hanada ....................... 346/135.1 X |
| 4,370,391 | 1/1983 | Mori ............................ 346/135.1 X |

*Primary Examiner*—Bruce H. Hess
*Attorney, Agent, or Firm*—Birch, Stewart, Kolasch & Birch

[57] ABSTRACT

A recording material comprising a substrate and a metallic recording layer, characterized by further comprising at least one mixture layer of a metallic compound and a metal has been found to have a high sensitivity and a high S/N ratio. When the recording material further comprises a stabilizing layer of a metal oxide and/or a stabilizing layer of a metallic compound, the storage stability and archivability can be improved, and, in some cases, the S/N ratio can be further improved.

13 Claims, 4 Drawing Figures

RECORDING MATERIAL

BACKGROUND OF THE INVENTION

This application is a continuation, of application Ser. No. 285,415 filed on July 22, 1981 now abandoned.

This invention relates to an information recording material suitable for use in heat mode recording. More particularly, this invention relates to an information recording material having excellent characteristics such as a high sensitivity and a high signal-to-noise ratio.

Information storage systems in which information is stored by selective ablation, evaporation, removal or modification of a recording medium irradiated spotwise with a focused laser beam or the like having high density or strong energy are known as the so-called heat mode recording process to those skilled in the art. The heat mode recording process is a dry process which does not need chemicals or treating solutions and in which a real-time recording can be made. According to this process, information can be quickly recorded in a high contrast form with a large capacity in respect of amount of information recordable per unit area of recording medium, and additional information can be recorded later. Due to such advantages, the heat mode recording process is of wide application in the field where a microimage recording medium, a computer-output microfilm, a video disk, a computer signal memory medium or the like is involved.

The heat mode recording medium such as is used particularly as the video disk or the computer signal memory medium generally comprises an information recording layer formed on a suitable substrate such as a circular plate or disk of glass or a synthetic resin. When a laser beam pulse-modulated is focused on the recording layer rotated at a high speed, holes of about 0.6 to 1.5µ in width are formed in the areas where the recording layer is irradiated with the laser beam, whereby information is recorded in the recording medium. The positions and sizes of the formed holes depend on the wave form of laser beam utilized, and correspond to the inputted information. The readout of the information stored in the recording medium is carried out by applying to the recording medium being rotated at a high speed a focused weak laser beam whose intensity is lower than the threshhold value to produce a hole in the recording layer, and detecting the variation of the reflected light.

The characteristics required of a heat mode recording medium are not only high sensitivity but also a high signal-to-noise ratio (hereinafter referred to as "S/N ratio"), storage stability, availability and the like. It is necessary for attaining a high S/N ratio in a video disk, a computer signal memory medium or the like that the holes formed in the recording medium upon the selective ablation by a laserbeam are substantially free of irregularities or disorders, and that an information readout light beam reflectivity or transmittance difference between the opening areas and the non-opening areas of the recording medium is as great as possible, which is equivalent to saying that the contrast is as high as possible. The terms "hole" and "opening" used herein are intended to mean ablated portions in which information is permanently stored by selective ablation of the recording material by means of an intensity modulated laser beam or the like.

Conventional recording media or materials used in heat mode recording or the like include those comprising a layer of an inorganic material such as a metal or a metallic compound and those comprising a layer of an organic material such as a dye, a pigment or a mixture thereof with a plastic. For recording information on such recording materials, the layer of the inorganic or organic material is irradiated with a laser beam to be evaporated or deformed in part to form a hole, or is caused to be subjected to a partial chemical change such as a change in degree of oxidation or in light absorptivity or reflectivity. In the case of the partial chemical change, the sensitivity of the recording material is so insufficient that the contrast between the changed areas and the unchanged areas is too low to obtain a high S/N ratio, and the archivability of the recorded material is too poor to be satisfactory in a practical sense. On the other hand, in the case of the hole formation which is carried out by evaporating part of the recording layer provided on a substrate or by deformation, removing part of the recording layer provided between a substrate and a stabilizing layer without evaporation, the recording material used in the former evaporation method is relatively good but still unsatisfactory in a practical sense in sensitivity and S/N ratio and defective in storage stability and archivability under a high humidity and in an oxidating atmosphere since its recording layer is exposed to the air for enabling the evaporation, while the recording material used in the latter deformation-removal method is satisfactory in storage stability and archivability due to the presence of the stabilizing layer but unsatisfactory in sensitivity and S/N ratio.

Therefore, it is an object of the present invention to provide a heat mode recording material which not only has a high sensitivity but also is excellent in S/N ratio, storage stability and archivability.

We previously made extensive investigations with a view to eliminating the drawbacks accompanying the conventional heat mode recording materials to succeed in attaining some improvements in sensitivity and S/N ratio by providing first and a second stabilizing layers sandwiching the metallic recording layer, said first stabilizing layer being comprised of an auxiliary metal oxide layer and an inorganic compound layer for converting the auxiliary metal oxide layer to a surface-flat glassy material. However, there has been still a demand for furthering such improvements since the attained improvements are unsatisfactory especially as regards to sensitivity and shape of holes formed upon irradiation of a laser beam, which holes are desired to have minimized disorders or irregularities at the edge portions.

It is therefore another object of the present invention to provide a heat mode recording material which has further improved sensitivity, and which is further improved in shape or profile of holes formed upon irradiation with a laser beam so as to provide holes substantially free of irregularities or disorders, which contributes to providing higher S/N ratio.

SUMMARY OF THE INVENTION

The foregoing and other objects, features and advantages of the present invention will be apparent to those skilled in the art from the following detailed description and appended claims taken in connection with the accompanying drawings in which:

DETAILED DESCRIPTION OF THE INVENTION

In accordance with the present invention, there is provided a recording material comprising a substrate, a metallic recording layer supported by said substrate, and at least one mixture layer of a metallic compound and a metal, said at least one mixture layer being provided on at least one side of said metallic recording layer.

According to the present invention, a high sensitivity and a high S/N ratio can be attained by providing the mixture layer of the metallic compound and the metal preferably on the same side of the metallic recording layer as is intended to be irradiated with a laser beam.

According to an embodiment of the present invention, the mixture layer is provided on the metallic recording layer formed on the substrate, and a stabilizing layer of metal oxide is preferably provided between the substrate and the metallic recording layer. The mixture layer in this embodiment not only exerts the effects as described above, but also serves as a protective layer for the metallic recording layer and, hence, provides excellent storage stability and archivability. In this recording material, recording is preferably effected by laser beam ablation through the mixture layer. This is because, when recording is effected by laser beam ablation through a transparent substrate, not only 1.5 to 2 times reduction in sensitivity is caused as compared with the case where recording is effected by laser beam ablation through the mixture layer but also irregularities or disorders appear in the edge portions of holes formed to provide a lowered S/N ratio. The recording material may further comprise, if desired, a stabilizing layer of metallic compound provided either between the metallic recording layer and the mixture layer, or on the mixture layer.

According to another embodiment of the present invention, the mixture layer is provided between a transparent substrate and the metallic recording layer. In this case, recording can advantageously be effected by laser beam ablation through the transparent substrate without the above-mentioned problems of the first embodiment being encountered. When recording on a recording material is effected according to this embodiment from the side of the metallic recording layer, poorer results are obtained as to sensitivity and shape of holes. On the metallic recording layer, a stabilizing layer of metallic compound, which provides protection for the metallic recording layer, is preferably formed. According to need, a stabilizing layer of metal oxide can be further formed either between the transparent substrate and the mixture layer or between the mixture layer and the metallic recording layer. The recording material according to this embodiment is excellent in sensitivity and S/N ratio even in the case of laser beam ablation through the transparent substrate as well as storage stability and archivality.

According to still another embodiment of the present invention, the mixture layers of the metal and the metallic compound are provided on both the upper and lower sides of the metallic recording layer, and these layers are supported on the substrate. If desired, a stabilizing layer of metal oxide may be provided between the substrate and the lower mixture layer, or between the lower mixture layer and the metallic recording layer, and/or a stabilizing layer of metallic compound may be provided either between the metallic recording layer and the upper mixture layer, or on the upper mixture layer. The provision of the two, upper and lower, mixture layers sandwiching the metallic recording layer therebetween not only contributes to the minimization of irregularities or disorders of shape of holes, but also brings about such an effect that a light beam reflectivity difference or contrast between the opening areas and non-opening areas of the recording material on which information is stored by laser beam ablation is greatly increased. As a result, the S/N ratio is greatly increased according to this embodiment. It is to be noted that, when the recording material has only one mixture layer, such an information readout light beam reflectivity difference or contrast is highly dependent on the thickness, composition and microstructure of the mixture layer, and is small when the light reflectivities are low.

Figure 1:
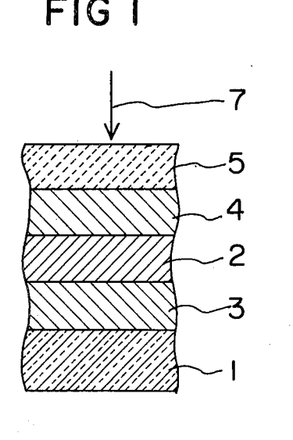
FIG. 1 is a cross-sectional view of one form of a recording material according to the present invention.

Referring now to FIG. 1, one form of a recording material according to the present invention comprises a substrate 1, a first stabilizing layer 3 of a metal oxide, a metallic recording layer 2, a second stabilizing layer 4 of a metallic compound which may optionally be omitted, and a mixture layer 5 of a metallic compound and a metal. The second stabilizing layer 4 interposed between the metallic recording layer 2 and the mixture layer 5 may be shifted on the mixture layer 5. In this recording material, recording may be effected by laser beam (shown by an arrow 7) ablation through the mixture layer 5 and, if present, the second stabilizing layer 4.

Figure 2:
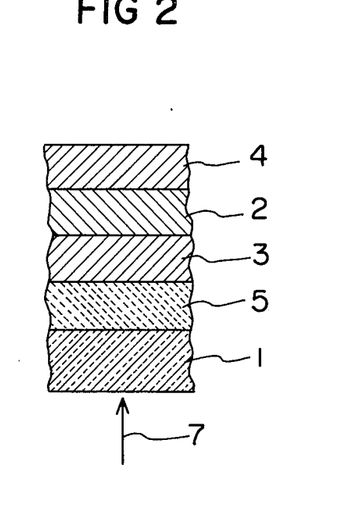
FIG. 2 is a cross-sectional view of another form of a recording material according to the present invention.

FIG. 2 shows another form of a recording material according to the present invention in which recording may be effected by selective laser beam (shown by an arrow 7) ablation through a transparent substrate. This recording material comprises a transparent substrate 1, a mixture layer 5 of a metallic compound and a metal, a first stabilizing layer 3 of a metal oxide which is formed if desired, a metallic recording layer 2, and a second stabilizing layer 4 of a metallic compound. The first stabilizing layer 3 interposed between the mixture layer 5 and the metallic recording layer 2 may be shifted between the substrate 1 and the mixture layer 5. Thus, the mixture layer 5 and the optional first stabilizing layer 3 are interchangeable in position.

Figure 3:
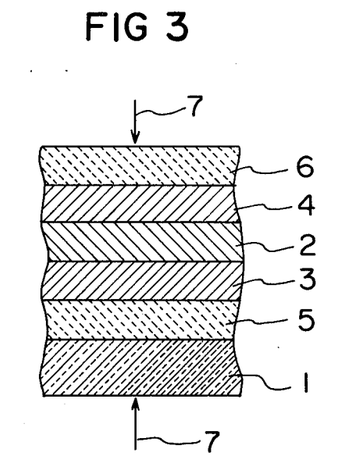
FIG. 3 is a cross-sectional view of still another form of a recording material according to the present invention.

FIG. 3 shows still another form of a recording material according to the present invention which comprises a (transparent) substrate 1, a first mixture layer 5 of a metallic compound and a metal, a first stabilizing layer 3 of a metal oxide which may optionally be omitted, a metallic recording layer 2, a second stabilizing layer 4 of a metallic compound which may optionally be omitted, and a second mixture layer 6 of a metallic compound and a metal. The optional first stabilizing layer 3 interposed between the mixture layer 5 and the metallic recording layer 2 may be shifted between the substrate 1 and the mixture layer 5. Thus, the first mixture layer 5 and the optional first stabilizing layer 3 are interchangeable in position. Also, the optional second stabilizing layer 4 interposed between the metallic recording layer 2 and the mixture layer 6 may be shifted on the mixture layer. Thus, the optional second stabilizing layer 4 and the second mixture layer 6 are interchangeable in position. In this recording material, recording may be effected by laser beam (shown by an arrow 7) ablation from either the upper or the lower (the substrate must be transparent) side of the recording material.

As examples of the substrate to be used in the recording material of the present invention, there can be mentioned films and plates of inorganic materials such as glass, mica and alloys of aluminum; and organic materials, for example, polymers such as polyesters, polypropylene, polycarbonate, polyvinyl chloride, polyamides, polystyrene and polymethyl methacrylate and modified polymers derived therefrom, copolymers of monomer units of the above polymers and blends thereof. Of such materials of the substrate, especially preferred are films and plates of polyesters and of polymethyl methacrylate. When the smoothness of the surface of the substrate itself has a great influence on the S/N ratio of a recording material as in the case of a video disk or the like, there may be employed a substrate obtained by coating a separately prepared film or plate with one of the above-mentioned polymers, for example, by a spin coating technique.

The mixture layer(s) of a metallic compound and a metal contribute(s) to suppressing the occurrence of minute disorders in holes formed upon laser beam ablation, and to increasing the sensitivity of the recording material. In addition, in the case of two mixture layers being provided on both of the sides of the metallic recording layer, as illustrated in FIG. 3, there is an increase in the reflectivity difference or contrast between the opening areas and the non-opening areas of the recording material subjected to laser beam ablation.

The reasons for the suppression of minute disorders in the shape of holes by the provision of the mixture layers are believed to be as follows. Although the theoretical analysis of the hole-forming mechanism of heat mode recording media has not been fully made as yet, (1) viscosity of the metal of the metallic recording layer when molten, (2) surface tension of the metal when molten and dispersed, (3) physical rigidities of layers adjacent to the metallic recording layer, which rigidities affect the metal melting and deforming performances, (4) heat scattering towards the surroundings affecting the solidification of the molten metal, (5) crystalization of the molten metal upon the solidification thereof, etc. are believed to be able to be mentioned as factors affecting the shape of holes formed upon selective ablation by a laser beam. Among them, the factors mentioned under (2) [in the case of the mixture layer contacted with the metallic recording layer], (3) and (4) are believed to be favorably affected by providing the mixture layer(s) to produce synergistically the desired effect of suppressing disorders in the shape of holes formed.

Since the mixture layer of the recording material according to the present invention has a secondary effect of reducing the reflectivity of the recording material, the sensitivity of the recording material will be increased by providing the mixture layer on the same side of the metallic recording layer as is intended to be irradiated with a monochromatic light such as a laser beam. However, if the reflectivity is too low, such a problem might arise that the information readout light beam reflectivity difference between the opening areas and the non-opening areas of the recording material subjected to laser beam ablation may be too small highly depending on the thickness, composition, microstructure, etc. of the mixture layer employed.

According to an embodiment of the present invention, the problem of low contrast or reflectivity difference as described above can be solved by providing a specific mixture layer of a metallic compound and a metal on each side of the metallic recording layer. Both the upper and lower mixture layers may be the same in every respect, but in order to attain a higher contrast or reflectivity difference, they are preferably different from each other in combination of kinds of metallic compound and metal used, volume percentage of the metal dispersed therein, or thickness thereof. The differences in various respects as mentioned above between the upper and the lower mixture layers may result in different optical characteristics, such as refractive index and coefficient of extinction, between the upper and the lower mixture layers. Thus, the desired reflectivity difference or contrast can be obtained by adjusting those optical characteristics.

Figure 4:
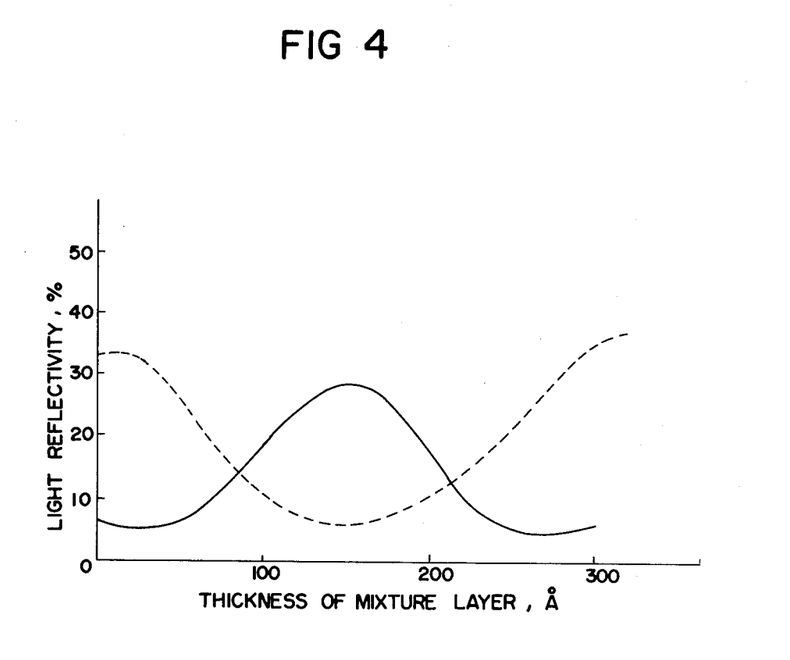
FIG. 4 is a graph showing variations of light reflectivities in the opening areas and in the non-opening areas of a recording material according to the present invention subjected to information recording and being subjected to information readout in accordance with the thickness of the mixture layer of the recording material.

As can be well imagined when reference is made to FIG. 4 which shows a relationship between the reflectivity of a recording material according to the present invention subjected to information recording by laser beam ablation and the thickness of the mixture layer thereof and wherein the reflectivity in the opening areas is represented by the dotted line and the reflectivity in the non-opening areas is represented by solid line; in the case of the upper and lower mixture layers having the same combination of kinds of metallic compound and metal and the same volume percentage of the metal; the information readout light beam reflectivities in the opening areas and the non-opening areas of the recording layer of the recording material respectively change sinusoidally in substantially the same manner with a phase lag of appoximately half-wave length in accordance with the change in thickness of the mixture layers; and the information readout light beam reflectivity difference therebetween has a maximum value in the reversal state of the two sinusoids at about 150 Å in thickness of the mixture layers although the difference may vary depending on the kinds of metallic compound and metal used in the mixture layers. The variation of either combination of kinds of metallic compounds and metals employed in the upper and lower mixture layers or of volume percentage of the metal dispersed in the mixture layers entails a change in and can give a maximum value of the information readout light beam reflectivity difference as in the case described above. Therefore, the information readout light beam reflectivity difference between the opening areas and the non-opening areas can be increased by the proper selection of combination of kinds of metallic compounds and metals employed in the mixture layers, volume percentages of the metal dispersed in the mixture layers, and the thicknesses of the mixture layers, leading to a high contrast and hence a high S/N ratio.

From a viewpoint of operating efficiency, it is advisable to prepare a recording material with a high contrast or reflectivity difference by choosing the most favorable volume percentage of the metal in each mixture layer and setting the thickness of each mixture layer as small as possible without varying the combination of metallic compound and metal between the upper and lower mixture layers. More specifically, for example, in the case of a kind of recording material which includes two mixture layers being the same in composition and thickness and formed on each side of a metallic recording layer supported by a transparent substrate, and in which, after information recording, the readout of information is to be effected by means of information readout light beam reflectivity difference by the irradiation with light through the transparent substrate; when the reflectivity in the opening areas of the recording material is greater than that in the non-opening areas (for example, around 300 Å in thickness in FIG. 4), a highly increased S/N ratio can be accomplished by setting the volume percentage of the metal dispersed in the mixture layer interposed between the substrate and the metallic recording layer greater than that in the mixture layer on the opposite side for increasing the reflectivity in the opening areas; while when the reflectivity in the opening areas is smaller than that in the non-opening areas (for example, around 150 Å in thickness in FIG. 4), a highly increased S/N ratio can be attained by setting the volume percentage of the metal dispersed in the mixture layer interposed between the substrate and the metallic recording layer smaller than that in the opposite mixture layer on the opposite side.

The mixture layer(s) of the recording material of the present invention is (are) comprised of a metallic compound and a metal.

As the metallic compound to be used in the mixture layer, there may be employed any of those capable of forming a layer or film of a mixture with a metal. Preferred are oxides and fluorides of Be, B, Mg, Al, Si, Ca, Sc, Ti, V, Cr, Mn, Fe, Co, Ni, Cu, Zn, Ga, Ge, As, Sr, Y, Zr, Nb, Tc, Ru, Rh, Pd, Ag, In, Sn, Sb, Ba, La, Hf, Ta, Re, Ir, Tl, Pb, Bi, Dy, Er, Gd, Nd, Pr, Ce, Mo, W, Te and Sm. More preferred are $Al_2O_3$, $ZrO_2$, $Cr_2O_3$, $GeO_2$, $SiO_2$, $SnO_2$, $Bi_2O_3$, $As_2O_3$, $Sb_2O_3$, $Ta_2O_3$, $Sm_2O_3$, $TiO_2$, $CeO_2$, $La_2O_3$ and $Dy_2O_3$. Glass-forming oxides such as $SiO_2$, $Ge_2$ and $Al_2O_3$ are especially useful for preventing the oxidation-deterioration of the metallic recording layer to stabilize the metallic recording layer, since they are excellent in shielding properties due to their amorphous network structures. These metallic compounds may be used either alone or in combination.

As the metal to be used in the mixture layer, there may be employed any of those capable of forming a film or layer of a mixture with a metallic compound as described above. Preferred metals are Al, Si, Sc, Ti, V, Cr, Mn, Fe, Co, Ni, Cu, Zn, Ga, Ge, As, Sr, Y, Zr, Nb, Tc, Ru, Rh, Pd, Ag, In, Sn, Sb, La, Hf, Ta, Re, Ir, Tl, Pb, Bi, Dy, Er, Gd, Nd, Pr, Sm, Mo, Au, Pt, W, Se and Te. These metals may be used either alone or in combination.

The mixture layer of the recording material of the present invention is preferably of such a structure that the metal is dispersed, in the form of minute particles having diameters or sizes smaller than the wave length of a laser beam to be employed for recording, in the metallic compound which serves as a dielectric medium. This structure can be obtained relatively easily by employing such a combination of kinds of metal and metallic compound that the free energy of formation of oxide or fluoride of the metal is greater than that of formation of the metallic compound.

The mixture layer can be formed by co-evaporation-deposition or co-sputtering of the metallic compound and the metal as described above which are separately contained in heating vaporization boats or electron beam evaporation crucibles. The mixture layer can alternatively be formed by using a pelletized mixture of the metallic compound and the metal according to a conventional film-forming technique such as electric resistance heating evaporation-deposition, electron beam evaporation-deposition ion-plating or sputtering. The vacuum evaporation-deposition technique is preferred because it is not only simple in operation but also excellent in reproducibility. From a viewpoint of stability of the mixture layer, it is desirable to effect the diposition under a pressure of $10^{-5}$ Torr or less. The thickness of the mixture layer may be in the range of 50 to 1,000 Å, preferably 100 to 800 Å. The volume percentage of the metal dispersed in the mixture layer may be in the range of 10 to 80%, preferably 20 to 60%.

As the metal for forming the metallic recording layer, there may be employed any of those which are well known in the art as the material capable of performing recording. From a viewpoint of sensitivity of the recording material, preferred metals are those with a low melting point such as In, Sb, Bi, Sn, Zn, Pb, Mg, Ge, Ga, Tl, Cd, As, Se and Te. From a viewpoint of storage stability or archivability of the recording material, preferred metals are Au, Rh and Al. These metals may be used either alone or in combination in the form of an alloy or a mixture.

In the case of a recording material comprising a metallic recording layer supported by a transparent substrate, and a mixture layer of a metallic compound and a metal provided between the metallic recording layer and the substrate, the above-mentioned metals can of course be utilized for forming the metallic recording layer, but it is desirable to employ a specific bismuth alloy containing a specific amount of antimony, which alloy gives better results in respect of sensitivity and shape of holes to be formed.

It is disclosed in Japanese Patent Application Laid-Open Specification No. 48838/1980 that a film of a bismuth alloy containing antimony in an amount of 1 to 15% in number of atoms provides a recording material having high S/N ratio and high storage stability. However, when a recording material of such a constrction as described above is subjected to recording by the irradiation with a laser beam through the transparent substrate, the use of a film of bismuth alloy containing antimony in an amount of 16 to 30% in number of atoms gives better results as to S/N ratio and sensitivity than the use of a film of the conventional bismuth alloy containing antimony in an amount of 1 to 15% in number of atoms and better results as to recording characteristics, including S/N ratio and sensitivity, than the use of one of the well-known metals with a low melting point.

The layer of a bismuth-antimony alloy with the high antimony content as mentioned above may further contain one or more of other elements for the purpose of improvement of sensitivity and shape of holes to be formed. As such other elements, there can be mentioned Sn, Zn, In, Pb, Mg, Au, Ge, Ga, Tl, Cd, As, Rh, Al, Se, Te and the like. In order to minimize minute disorders or irregularities in a hole formed upon irradiation with a laser beam, it is most desirable to employ such a bismuth alloy for forming the recording layer that the bismuth content is in the range of 50 to 84% in number of atoms.

A recording material according to the present invention which comprises a metallic recording layer of a bismuth alloy containing antimony in an amount of 16 to 30% in number of atoms and a mixture layer interposed between the metallic recording layer and a transparent substrate, is capable of providing a high S/N ratio and a good shape of holes to be formed, probably because a peculiar effect is brought about by the combined action of the specific recording layer and the mixture layer upon irradiation with a laser beam through the transparent substrate.

As described hereinbefore, there are the factors (1) to (5) affecting the shape of holes formed by the information recording operation. When recording is effected by laser beam ablation through the transparent substrate, the factors (3) and (4) are believed to be favorably affected by the provision of the mixture layer to produce a synergistic effect for providing a regular or orderly shape of holes formed.

The metallic recording layer of the recording material of the present invention may comprise either a single layer structure or a multiple layer structure. When two or more kinds of metals are employed in combination, they may be included in the metallic recording layer in any form of a single layer structure of an alloy, a multi-layer structure of respective layers of different metals, a multi-layer structure of a layer of a single metal and a layer of an alloy, and the like. In order to obtain a recording material capable of providing excellent and regular profiles of holes, a multi-layer structure of respective layers of different metals is desirable.

When a combination of bismuth and antimony in an amount of 16 to 30% in number of atoms is employed as the metallic recording layer in the case of a recording material comprising the mixture layer of the metal and the metallic compound between the transparent substrate and the metallic recording layer, the recording layer may be in any form of those structures described above so long as the total amount of antimony in the metallic recording layer is within the range described above. It is, however, to be noted that even if bismuth and antimony are deposited in separate layers, they are believed to form a Bi-Sb alloy.

The metallic recording layer may contain small amounts of oxides such as a suboxide of the metal used therein as far as the oxides do not spoil the properties required of the metallic recording layer.

The metallic recording layer may be formed by means of a conventional film-forming technique, for example, vacuum evaporation-deposition, sputtering, ion-plating, electroplating, electroless plating or plasma deposition.

As the method for forming the metallic recording layer, the vacuum evaporation-deposition technique is preferred because it is not only simple in operation but also excellent in reproducibility. In order to obtain a recording material having not only a high sensitivity but also excellent storage stability and archivability even at high temperatures and high humidities, it is desirable to effect the evaporation-deposition under high vacuum, for example, under a pressure of $10^{-5}$ Torr or less. The thickness of the metallic recording layer may be varied according to the use of the recording material, but is preferably in the range of about 100 to 5,000 Å, more preferably 200 to 600 Å.

In recording materials such as is illustrated in FIG. 1 to 3, there are provided a first stabilizing layer 3 of a metal oxide and a second stabilizing layer 4 of a metallic compound, respectively. The terms "first stabilizing layer" and "second stabilizing layer" are used herein to mean layers respectively provided under and over the metallic recording layer to improve the stability of the metallic recording layer against deterioration by oxidation and the like. The first stabilizing layer, when provided between the substrate and the mixture layer or between the mixture layer and the metallic recording layer can contribute to providing a better shape of holes formed upon irradiation with a laser beam besides the stabilization of the metallic recording layer.

The first stabilizing layer is made of a metal oxide, preferred examples of which include oxides of such elements as Be, B, Mg, Al, Si, Ga, Ca, Sc, Ti, V, Cr, Mn, Fe, Co, Ni, Cu, Li, Zn, Ge, As, Sr, Y, Zr, Nb, Te, Ru, Rh, Pd, Ag, In, Sn, Sb, Ba, Ce, La, Hf, Ta, Re, Ir, Tl, Pb, Bi, Dy, Er, Gd, Nd, Pr and Sm. More preferred are oxides of elements such as Si, Al, Ge, Sb, Zr, Ta, Bi, Pb, Zn, Li, Mg, Ti, La, Ce, Y, Dy, Er, Gd, Hf, Sm, Cr, Nd and Pr. Especially preferred examples of metal oxides include $SiO_2$, $Al_2O_3$, $GeO_2$, $Sb_2O_3$, $ZrO_2$, $Ta_2O_3$, $Bi_2O_3$, PbO, ZnO, $Li_2O$, MgO, $TiO_2$, $La_2O_3$, $CeO_2$, $Y_2O_3$, $Dy_2O_3$, $Er_2O_3$, $Gd_2O_3$, $HfO_2$, $Sm_2O_3$ and $Cr_2O_3$.

In order to obtain a recording material capable of providing a better shape of holes upon irradiation of a laser beam and having a better storage stability and archivability, it is desirable to form the first stabilizing layer in the form of a double-layer structure made of two layers different in kind of metal oxide.

The first stabilizing layer of the metal oxide can be formed by a conventional thin film-forming technique such as vacuum evaporation-deposition, sputtering, ion-plating or plasma deposition. The first stabilizing layer can also be formed by reactive sputtering in which air, oxygen or oxygen-argon is introduced in the sputtring atmosphere and a plurality of targets containing different single metals or a target containing two or more kinds of metals is used. Depending upon the kind of thin film-forming technique employed, a suboxide corresponding to the metal oxide may be formed in the stabilizing metal oxide layer in the course of thin film formation. For example, when a metal oxide such as $GeO_2$ is to be deposited by electron beam evaporation under a high vacuum to form a metal oxide layer, $GeO_x$ ($x = 1$ to 2), which is formed by partial decomposition of $GeO_2$, may occasionally be contained in the resulting stabilizing metal oxide layer. However, the presence of suboxide is permissible so long as it presents substantially no problems for the purpose of the present invention. In order to prevent such formation of suboxide during the deposition of an stabilizing metal oxide layer, the deposition may be conducted in a low-vacuum atmosphere into which air, oxygen or the like is leaking.

The thickness of the first stabilizing layer may be varied depending on the kind of metal oxide formed. However, in general, if the metal oxide layer is too thick, cracks are apt to develop in the metal oxide layer. It is therefore preferred that the thickness of the stabilizing metal oxide layer be 10 to 10,000 Å, more preferably 20 to 300 Å.

The second stabilizing layer that may optionally be provided between the metallic recording layer and the mixture layer or on the mixture layer in the case of the mixture layer provided over the metallic recording layer is made of a metallic compound, preferred examples of which include oxides, nitrides and fluorides of Be, B, Mg, Al, Si, Ga, Ca, Sc, Ti, V, Cr, Mn, Ce, Fe, Co, Ni, Cu, Zn, Ge, As, Sr, Y, Zr, Nb, Te, Ru, Rh, Pd, Ag, In, Sn, Sb, Ba, La, Hf, Ta, Re, Ir, Tl, Pb, Bi, Dy, Er, Gd, Li, Nd, Pr or Sm. More preferred are oxides, nitrides and fluorides of Al, Ge, Zr, Si, Ti, Ce, Ta, La, Cr, Y, Dy, Er, Gd, Hf, Sm, Bi, Pb, Zn, Li, Mg, Sb, Pr or Nd.

In order to obtain a recording material capable of providing a better shape of holes upon irradiation with a laser beam and having a better storage stability and archivability, it is preferred that the second stabilizing layer has a doublelayer structure made of two layers different in kind of metallic compound. This stabilizing layer of the metallic compound can be formed in the same manner as in the formation of the first stabilizing layer of metal oxide. The thickness of the second stabilizing layer is preferably in the range of 10 to 1,000 Å, more preferably 20 to 300 Å.

The recording material of the present invention may further comprise a transparent outermost protective layer for preventing a mechanical damage. The transparent protective layer may comprise an organic polymer as either the main or the sole component.

As examples of organic polymers that may be used in the transparent protective layer, there can be mentioned polyvinylidene chloride, copolymers of vinylidene chloride and acrylonitrile, polyvinyl acetate, polyimides, polyvinyl cinnamate, polyisoprene, polybutadiene, polystyrene, polymethyl methacrylate, polyurethanes, polyvinyl butyral, fluororubbers, polyamides, polyesters, epoxy resins, cellulose acetate and terpolymers of vinyl acetate-vinyl butyral-vinyl alcohol; modified polymers thereof; and copolymers of monomer units of the above polymers. They may be used either alone or in mixture. Polyesters, fluororubbers and terpolymers of vinyl acetate-vinyl butyral-vinyl alcohol are especially preferred.

A silicone oil, an antistatic agent, and a crosslinking agent for improving film strength and antistatic properties may be added to the organic polymer for the transparent protective layer. If desired, the transparent protective layer may be of a multilayer structure.

The transparent protective layer can be formed by the coating of a coating composition containing an organic polymer dissolved in a suitable solvent, or by the lamination of a thin film of an organic polymer. The thickness of the transparent protective layer is preferably in the range of 0.1 to 10$\mu$.

The recording material according to the present invention are excellent in sensitivity, storage stability and archivability as well as shape of holes to be formed upon irradiation with a laser beam and, hence, S/N ratio.

Since the recording material of the present invention has a capability of forming thereon a minute pattern upon irradiation with a laser beam either from the side of the substrate or from the side remote from the substrate, the material, after subjected to pattern formation, can also be used as a mask through which a photoresist composition is exposed to light to form a resist useful in the production of a master plate for a replica of video disk.

PREFERRED EMBODIMENTS

The following Examples illustrate the present invention in more detail but should not be construed as limiting the scope of the invention. In the following Examples, the term "packing ratio" is intended to mean a volume percentage of a metal dispersed in a mixture layer.

EXAMPLE 1 AND COMPARATIVE EXAMPLE 1

A smooth surface-having polymethyl methacrylate disk of 30 cm in diameter prepared by casting was so set in vacuum deposition equipment that the disk could be rotated in the center portion of the equipment. The equipment included three heating vaporization boats and an electron beam vacuum evaporation apparatus having five crucibles. Bi, Sn and Au were separately put in the heating vaporization boats, and $Sm_2O_3$ and MgO were separately put in two of the crucibles of the electron beam vacuum evaporation apparatus. After the equipment was pumped down to a vacuum of $2\times10^{-6}$ Torr, a 100 Å-thick film of $Sm_2O_3$, a 300 Å-thick film of Bi and a 100 Å-thick film of Sn were deposited in sequence on the disk being rotated at 120 rpm. MgO and Au were subsequently co-evaporation-deposited thereon to form a uniform mixture layer having a thickness of 300 Å and a packing ratio of 0.3. The thickness of a film or layer being deposited on the disk was monitored by means of a quartz oscillator, and controlled automatically in the order of the materials to be deposited in sequence in accordance with a program. The deposition of all the above-mentioned films was completed in about 2 minutes. All through the vacuum evaporation, the vacuum of the equipment was $2-3\times10^{-6}$ Torr except that the vacuum was of the order of $4\times10^{-6}$ Torr at the initial stages of the oxide deposition. No positive heating of the disk was conducted during the vacuum evaporation, and substantially no increase in temperature of the disk was observed.

A semiconductor laser beam modulated to have a pulse width of 500 nsec was condensed to 1$\mu$ in beam diameter by means of a lens, and applied to the metallic recording layer of the so prepared recording disk being rotated at 450 rpm to effect recording. Elliptical holes of about 1$\mu$ in length of minor axis were formed in the areas where the metallic recording layer was irradiated with the laser beam whose intensity examined at the surface of the recording disk was at least 4 mW (threshold intensity). Using the resulting disk, a C/N ratio ("carrier-to-noise ratio", which can be converted to "S/N ratio") was examined by means of a spectrum analyzer to which a 1 MHz standard signal had been given, and found to be about 40 dB.

A comparative recording disk was prepared in substantially the same manner as described above except that the mixture layer of MgO and Au was omitted. The threshold intensity of a laser beam capable of producing a hole in the recording layer of the comparative recording disk was examined and found to be 9 mW. The C/N ratio of the disk was about 25 dB.

EXAMPLE 2 AND COMPARATIVE EXAMPLE 2

In substantially the same manner as in Example 1, a 100 Å-thick film of $Al_2O_3$, a 100 Å-thick film of $GeO_2$, a 200 Å-thick film of Bi, a 200 Å-thick film of Sn and a 100 Å-thick film of $GeO_2$ were deposited in sequence on a polymethyl methacrylate disk as used in Example 1 under a vacuum of $2\times10^{-6}$ Torr. Then, a 500 Å-thick mixture layer of $Al_2O_3$ and Ge having a packing ratio of 0.3 was co-evaporation-deposited thereon to obtain a recording disk according to the invention. The threshold intensity of a laser beam capable of producing a hole in the recording layer of the disk (sensitivity) was examined in the same manner as in Example 1, and found to be 3.5 mW. The holes recorded on the recording disk had an excellent shape or profile.

A comparative recording disk was prepared in substantially the same manner as described above except that the mixture layer of $Al_2O_3$ and Ge was omitted and instead, a 0.2$\mu$-thick layer of a polyester resin was formed as an anti-reflection layer by the spin coating technique. The sensitivity of the comparative recording disk was 4.5 mW.

For examining storage stability with the lapse of time, both the disks were subjected to an accelerated storage or aging test which was carried out at a high temperature and a high relative humidity (60° C., 70%; the same conditions as to temperature and humidity were employed in other Examples and Comparative Examples). The recording disk according to the present invention, even after subjected to the test for ten and several days, showed no changes in sensitivity and shape of holes formed upon irradiation with a laser beam condensed and modulated in the same manner as in Example 1. The comparative recording disk, after subjected to the test for ten and several days, showed some decrease in sensitivity and some disorder in shape of holes formed upon irradiation with the same laser beam as employed in Example 1. The holes recorded on each of the disk according to the present invention and the comparative disk before subjected to the test did not show any change in shape by the storage test.

EXAMPLE 3 AND COMPARATIVE EXAMPLE 3

In substantially the same manner as in Example 1, a 100 Å-thick film of $La_2O_3$, a 400 Å-thick film of Bi, a 100 Å-thick film of $GeO_2$, and a 350 Å-thick co-evaporated mixture film of $SiO_2$ and Ni having a packing ratio of 0.4 were deposited in sequence on a polymethyl methacrylate disk as used in Example 1 under a vacuum of $2\times10^{-6}$ Torr. Thus, a recording disk which has a first or lower $La_2O_3$ stabilizing layer, a Bi metallic recording layer, a second or upper $GeO_2$ stabilizing layer, and a mixture layer of $SiO_2$ and Ni was obtained. The threshold intensity of a laser beam capable of producing a hole in the recording layer of the disk (sensitivity) was examined in the same manner as in Example 1, and found to be 3.5 mW. The holes recorded on the recording disk were free from disorders in shape or profile.

A comparative recording disk was prepared in substantially the same manner as described above except that the mixture layer of $SiO_2$ and Ni was replaced with a 1,400 Å-thick anti-reflection layer of $SiO_2$. The sensitivity of the comparative recording disk was 5.0 mW. The holes recorded on the disk were somewhat small in size as compared with the holes formed on the recording disk according to the present invention, and had a somewhat disordered edge line.

EXAMPLE 4 AND COMPARATIVE EXAMPLE 4

In substantially the same manner as in Example 1, a 50 Å-thick film of $Al_2O_3$, a 50 Å-thick film of $GeO_2$, a 300 Å-thick film of Bi, a 200 Å-thick film of Sn, a 50 Å-thick film of $GeO_2$ and a 400 Å-thick co-evaporated mixture film of $Al_2O_3$ and Au having a packing ratio of 0.5 were deposited in sequence on a polymethyl methacrylate disk as used in Example 1. Thus, a recording disk which has a first or lower $Al_2O_3$-$GeO_2$ stabilizing layer, a BiSn metallic recording layer, a second or upper $GeO_2$ stabilizing layer, and a mixture layer of $Al_2O_3$ and Au was obtained. The threshold intensity of a laser beam capable of producing a hole in the recording layer of the disk (sensitivity) was examined in the same manner as in Example 1, and found to be 3.0 mW. The holes recorded on the recording disk were free from disorders in shape or profile.

The recording disk according to the invention, even after subjected to a three-week accelerated storage test carried out at a high temperature and a high humidity, showed no changes in sensitivity and shape of holes formed upon irradiation with a laser beam.

A comparative recording disk was prepared in substantially the same manner as described above except that the mixture layer of $Al_2O_3$ and Au was replaced with a 0.2$\mu$-thick film of a polyester resin formed by the spin coating technique. The sensitivity of the comparative recording disk was 4.0 mW. The holes recorded on the disk were not so unsatisfactory in shape but had a more disordered edge line than the recording disk according to the present invention.

EXAMPLE 5 COMPARATIVE EXAMPLE 5

In substantially the same manner as in Example 1, a 80 Å-thick film of $Sm_2O_3$, a 300 Å-thick film of Bi, and a 80 Å-thick film of $GeO_2$ were deposited in sequence on a polymethyl methacrylate disk as used in Example 1. Then, $GeO_2$ and Cr in the form of mixed pellets were co-evaporation-deposited on the 80 Å-thick film of $GeO_2$ by electron beam evaporation-deposition to form a 300 Å-thick mixture film of $GeO_2$ and Cr having a packing ratio of 0.3. Thus, a recording disk which has a first or lower $Sm_2O_3$ stabilizing layer, a Bi metallic recording layer, a second or upper $GeO_2$ stabilizing layer, and a mixture layer of $GeO_2$ and Cr was obtained.

The threshold intensity of a laser beam capable of producing a hole in the recording layer of the disk (sensitivity) was examined in the same manner as in Example 1, and found to be 4.0 mW. The holes recorded on the disk were free from disorders in shape or profile.

A comparative recording disk was prepared in substantially the same manner as described above except that the mixture layer of $GeO_2$ and Cr was omitted. The sensitivity of the comparative recording disk was 9.0 mW.

EXAMPLE 6 AND COMPARATIVE EXAMPLE 6

Bi, Sn, and Au were separately put in the three heating vaporization boats in the vacuum deposition equipment and $Sm_2O_3$, $MgF_2$, and MgO separately in three of the crucibles of the electron beam vacuum evaporation apparatus. After the equipment was pumped down to a vacuum of $2\times10^{-6}$ Torr, MgO and Au were co-evaporation-deposited on a polymethyl methacrylate disk being rotated at 120 rpm to form a uniform mixture layer of MgO and Au having a thickness of 200 Å and a packing ratio of 0.3. A 100 Å-thick film of $Sm_2O_3$, a 300 Å-thick film of Bi, a 100 Å-thick film of Sn, and a 100 Å-thick film of $MgF_2$ were subsequently deposited in sequence on the mixture layer of MgO and Au.

A semiconductor laser beam of 840 nm in oscillation wavelength modulated to have a pulse width of 500 nsec was condensed to have a beam diameter of 1$\mu$ by means of a lens, and applied through the polymethyl methacrylate substrate (1.1 mm in thickness) to the metallic recording layer of the thus prepared recording disk being rotated at 450 rpm to effect recording. Elliptical holes of about 1$\mu$ in length of minor axis were formed in the areas where the metallic recording layer was irradiated with the laser beam. The threshold intensity of a laser beam capable of forming a hole, examined at the surface of the recording disk, was 5 mW. The holes recorded on the disk were free from disorders in shape or profile.

A comparative recording disk was prepared in substantially the same manner as described above except that the co-evaporation-deposited mixture layer of MgO and Au was omitted. The threshold intensity of a laser beam capable of forming a hole in the recording layer of the comparative disk, examined at the surface of the recording disk, was 9 mW. The holes recorded on the disk had a disordered edge line.

EXAMPLE 7 AND COMPARATIVE EXAMPLE 7

In substantially the same manner as in Example 6, a 500 Å-thick co-evaporated mixture layer of $SiO_2$ and Ni having a packing ratio of 0.3, a 200 Å-thick film of $Y_2O_3$, a 350 Å-thick film of Sb and a 100 Å-thick film of $GeO_2$ were deposited in sequence on a 1.1 mm-thick polymethyl methacrylate disk under a vacuum of $2 \times 10^{-6}$ Torr to obtain a recording disk according to the invention.

In the same manner as in Example 6, a semiconductor laser beam was condensed to have a beam diameter of $1\mu$ by means of a lens, and applied through the polymethyl methacrylate substrate to the metallic recording layer of the thus prepared recording disk to effect recording. The threshold intensity of a laser beam capable of producing a hole in the metallic recording layer of the disk (sensitivity) was examined and found to be 6.0 mW. The holes recorded on the disk were about $1\mu$ in length of minor axis and were substantially free from disorders in shape or profile.

A comparative recording disk was prepared in the same manner as described above except that the mixture layer of $SiO_2$ and Ni was omitted. The sensitivity of the comparative recording disk was 9 mW. The holes recorded on the disk were also about $1\mu$ in length of minor axis, but they had a somewhat disordered edge line.

EXAMPLE 8 AND COMPARATIVE EXAMPLE 8

In substantially the same manner as in Example 6, a 500 Å-thick co-evaporated mixture layer of $Al_2O_3$ and Au having a packing ratio of 0.4, a 50 Å-thick film of $GeO_2$, a 250 Å-thick film of Bi, a 80 Å-thick film of Sn and a 50 Å-thick film of $GeO_2$ were deposited in sequence on a 1.1 mm-thick polymethyl methacrylate disk under a vacuum of $2 \times 10^{-6}$ Torr to obtain a recording disk.

Separately, a comparative recording disk was prepared in the same manner as described above except that the mixture layer of $Al_2O_3$ and Au was omitted.

In the same manner as in Example 6, a semiconductor laser beam was condensed to have a beam diameter of $1\mu$ by means of a lens, and applied to the metallic recording layer of each of the thus prepared recording disks through the polymethyl methacrylate substrate to effect recording. In the case of the recording disk according to the invention, the threshold intensity of a laser beam capable of producing a hole in the metallic recording layer of the disk (sensitivity) was 5 mW, and the holes formed had a good elliptical shape. On the other hand, in the case of the comparative recording disk, the sensitivity was 12 mW, and the holes recorded had a somewhat polygonal shape with a disordered edge line and with a more heaped edge portion than that in the case of the recording disk according to the invention.

For examining storage stability, both the disks were subjected to an accelerated storage test which was carried out at a high temperature and a high humidity. The recording disk according to the invention, even after subjected to the test for ten and several days, showed no deterioration in sensitivity and shape of holes formed upon irradiation with the laser beam as employed above. The comparative recording disk, after subjected to the test only for several days showed a marked decrease in sensitivity and marked disorders in shape of holes formed upon irradiation with the laser beam as employed above. The holes recorded on each of the disk according to the invention and the comparative disk prior to the storage test did not show any changes in shape by the storage test.

EXAMPLE 9 AND COMPARATIVE EXAMPLE 9

In substantially the same manner as in Example 6, a 300 Å-thick co-evaporated mixture layer of $Al_2O_3$ and Cr having a packing ratio of 0.5, a 100 Å-thick film of $Sm_2O_3$, a 400 Å-thick film of Pb and a 100 Å-thick film of $GeO_2$ were deposited in sequence on a 1.1 mm-thick polymethyl methacrylate disk under a vacuum of $2 \times 10^{-6}$ Torr to obtain a recording disk.

Separately, a comparative recording disk was prepared in the same manner as described above except that the mixture layer of $Al_2O_3$ and Cr was omitted.

In the same manner as in Example 6, a semiconductor laser beam was condensed to have a beam diameter of $1\mu$ by means of a lens, and applied to the metallic recording layer of each of the thus prepared recording disks through the polymethyl methacrylate substrate to effect recording. In the case of the recording disk according to the invention, the threshold intensity of a laser beam capable of forming a hole in the metallic recording layer (sensitivity) was 6.0 mW, and the holes recorded had a good shape almost free from disorders in the edge line. On the other hand, the sensitivity of the comparative recording disk was 10 mW, and the holes recorded had a somewhat disordered edge line.

For examining storage stability, both the disks were subjected to an accelerated storage test which was carried out at a high temperature and a high humidity. The recording disk according to the invention, even after subjected to the test for twenty days, showed substantially no deterioration in sensitivity and shape of holes formed upon irradiation with the laser beam as employed above. The comparative recording disk, after subjected to the test only for two or three days, showed a marked decrease in sensitivity and marked disorders in shape of holes formed upon irradiation with the laser beam as employed above. Formation of pinholes was also observed in the comparative recording disk subjected to the storage test for two or three days, while formation of pinholes was hardly observed in the recording disk according to the invention after subjected to the storage test for twenty days.

EXAMPLE 10 AND COMPARATIVE EXAMPLE 10

In substantially the same manner as in Example 6, a 500 Å-thick co-evaporated mixture layer of $GeO_2$ and Bi having a packing ratio of 0.2, a 100 Å-thick film of $La_2O_3$, a 250 Å-thick film of Bi, a 50 Å-thick film of Sn, a 100 Å-thick film of Bi and a 100 Å-thick film of $GeO_2$ were deposited in sequence on a 1.1 mm-thick polymethyl methacrylate disk under a vacuum of $2\times10^{-6}$ Torr to obtain a recording disk according to the invention.

A comparative recording disk was prepared in the same manner as described above except that the mixture layer of $GeO_2$ and Bi was omitted.

In the same manner as in Example 6, a semiconductor laser beam was condensed to have a beam diameter of 1μ by means of a lens, and applied to the metallic recording layer of each of the thus prepared recording disks through the polymethyl methacrylate substrate to effect recording. In the case of the recording disk according to the invention, the threshold intensity of a laser beam capable of forming a hole in the metallic recording layer of the disk (sensitivity) was 4.0 mW, and the holes formed were practically elliptical in shape and almost free from disorders in the edge line. On the other hand, in the case of the comparative recording disk, the sensitivity was 8.5 mW, and the holes formed had a disordered edge line.

EXAMPLE 11 AND COMPARATIVE EXAMPLE 11

In substantially the same manner as in Example 6, a 100 Å-thick film of $Al_2O_3$, a 300 Å-thick co-evaporated mixture layer of $GeO_2$ and Ag having a packing ratio of 0.3, a 350 Å-thick film of Bi (metallic recording layer) and a 100 Å-thick film of $GeO_2$ were deposited in sequence on a 1.1 mm-thick polymethyl methacrylate disk under a vacuum of $2\times10^{-6}$ Torr to obtain a recording disk according to the invention.

A comparative recording disk was prepared in the same manner as described above except that the mixture layer of $GeO_2$ and Ag was replaced with a 300 Å-thick layer of $GeO_2$.

In the same manner as in Example 6, a semiconductor laser beam was condensed to have a beam diameter of 1μ by means of a lens, and applied to the metallic recording layer of each of the thus prepared recording disks through the polymethyl methacrylate substrate to effect recording. In the case of the recording disk according to the invention, the thresold intensity of a laser beam capable of forming a hole in the metallic recording layer (sensitivity) was 5.0 mW, and the holes formed had a good elliptical shape almost free from disorders in the edge line. On the other hand, in the case of the comparative recording disk, the sensitivity was 10.5 mW, and the elliptical holes formed had a disordered edge line.

EXAMPLE 12 AND COMPARATIVE EXAMPLE 12

In substantially the same manner as in Example 6, a 300 Å-thick co-evaporated mixture layer of $Sm_2O_3$ and Au having a packing ratio of 0.4, a 250 Å-thick film of Bi and a 150 Å-thick film of Sn (metallic recording layer), and a 50 Å-thick film of $GeO_2$ were deposited in sequence on a 1.1 mm-thick polymethyl methacrylate disk under a vacuum of $2\times10^{-6}$ Torr to obtain a recording disk according to the invention.

A comparative recording disk was prepared in the same manner as described above except that the mixture layer of $Sm_2O_3$ and Au was replaced with a 300 Å-thick layer of $Sm_2O_3$.

In the same manner as in Example 6, a semiconductor laser beam was condensed to have a beam diameter of 1μ by means of a lens, and applied to the metallic recording layer of each of the thus prepared recording disks through the polymethyl methacrylate substrate to effect recording. In the case of the recording disk according to the invention, the threshold intensity of a laser beam capable of forming a hole in the metallic recording layer of the disk (sensitivity) was 4.5 mW, and the holes formed had a good elliptical shape almost free from disorders in the edge line. On the other hand, in the case of the comparative recording disk, the sensitivity was 9.0 mW, and the elliptical holes formed had a somewhat disordered edge line.

EXAMPLE 13

Bi, Sn, and Au were separately put in the three heating vaporization boats of the vacuum deposition equipment and MgO in one of the crucibles of the electron beam vacuum evaporation apparatus. After the equipment was pumped down to a vacuum of $2\times10^{-6}$ Torr, MgO and Au were co-evaporation-deposited on a polymethyl methacrylate disk being rotated at 120 rpm to form a uniform mixture layer of MgO and Au having a thickness of 500 Å and a packing ratio of 0.2. A 250 Å-thick film of Bi and a 100 Å-thick film of Sn (metallic recording layer), and a 500 Å-thick co-evaporated mixture layer of MgO and Au having a packing ratio of 0.5 were subsequently deposited in sequence on the mixture layer of MgO and Au to obtain a recording disk according to the invention.

Using the recording disk thus prepared, recording was effected in the same manner as in Example 1. The threshold intensity of a laser beam capable of forming a hole, examined at the surface of the recording disk, was 3 mW. The holes recorded on the disk were free from disorders in shape or profile.

A laser beam condensed by means of a lens but having an intensity not exceeding the threshold intensity (sensitivity of the recording disk) was subsequently applied to the recording disk while auto-focussing and auto-tracking the condensed laser beam on the recording disk to effect readout of the information recorded. The reflectivities of the recording disk in the opening areas (holes) and in the non-opening areas were examined by means of a light sensor and found to be 40% and 5%, respectively.

Another recording disk according to the invention was prepared in the same manner as described above except that the lower mixture layer of MgO and Au was replaced with a 500 Å-thick film of MgO. The sensitivity of this recording disk was examined in the same manner as described above, and found to be the same (3.0 mW) as that of the recording disk described above, and the holes recorded on this recording disk also had an elliptical shape in good order. But the reflectivities of this recording disk in the opening areas and the non-opening areas were 30% and 5%, respectively.

Thus, it could be confirmed that the reflectivity of each of the recording disks in the opening areas is greater than that in the non-opening areas, and that information is reversely recorded on each of the disks. It could also be confirmed that the two mixture layers having different packing ratios and respectively provided on and beneath the metallic recording layer enabled the recording disk to realize a high reflectivity difference or contrast in the readout of information recorded as compared with the only one mixture layer provided on the metallic recording layer.

EXAMPLE 14

In substantially the same manner as in Example 13, a 300 Å-thick co-evaporated mixture layer of $Al_2O_3$ and Ge having a packing ratio of 0.5, a 50 Å-thick film of $GeO_2$, a 400 Å-thick film of Bi, and a 300 Å-thick co-evaporated mixture layer of $Al_2O_3$ and Cr having a packing ratio of 0.2 were deposited in sequence on a polymethyl methacrylate disk under a vacuum of $2 \times 10^{-6}$ Torr. Thus, a recording disk which has a first or lower mixture layer of $Al_2O_3$ and Ge, a $GeO_2$ stabilizing layer, a Bi metallic recording layer, and a mixture layer of $Al_2O_3$ and Cr was obtained.

The threshold intensity of a laser beam capable of producing a hole in the recording layer of the disk (sensitivity) was examined in the same manner as in Example 13, and found to be 4.5 mW. The holes recorded on the recording disk had a good elliptical shape free from disorders in the edge line. In the readout of the information recorded, the reflectivities of the recording disk in the opening areas and the non-opening areas were 8% and 50%, respectively.

Another recording disk according to the invention was prepared in substantially the same manner as described above except that the lower mixture layer of $Al_2O_3$ and Ge was replaced with a 300 Å-thick layer of $Al_2O_3$. The sensitivity of this recording disk was 4.5 mW, and the holes recorded on this recording disk had a good elliptical shape free from disorders in the edge line. In the readout of the information recorded, however, the reflectivities of this recording disk in the opening areas and the non-opening areas were 15% and 45%, respectively.

It was confirmed that, unlike in the case of Example 13, the reflectivity of each of the recording disks in the opening areas was smaller than that in the non-opening areas, and that the reversal of readout of information did not take place. It also was confirmed that the two mixture layers differing in conbination of kinds of metal and metallic compound and in packing ratio and respectively provided on and under the metallic recording layer enabled the recording disk to realize a high reflectivity difference or contrast in the readout of the recorded information as compared with the only one mixture layer provided on the metallic recording layer.

EXAMPLE 15

In substantially the same manner as in Example 13, a 200 Å-thick co-evaporated mixture film of $Al_2O_3$ and Cr having a packing ratio of 0.7, a 50 Å-thick film of $GeO_2$, a 250 Å-thick film of Bi, a 50 Å-thick film of Sn, a 100 Å-thick film of Bi and a 500 Å-thick co-evaporated mixture film of $Al_2O_3$ and Cr having a packing ratio of 0.2 were deposited in sequence on a transparent polymethyl methacrylate disk as used in Example 13. Thus, a recording disk which has a first mixture layer of $Al_2O_3$ and Cr, a first stabilizing layer of $GeO_2$, a metallic recording layer comprised of two Bi layers and an Sn layer therebetween, and a second mixture layer of $Al_2O_3$ and Cr was obtained.

Using the recording disk, recording was carried out in substantially the same manner as in Example 1 except that the laser beam was applied through the polymethyl methacrylate substrate. The threshold intensity of a laser beam capable of producing a hole in the recording layer of the disk (sensitivity) was 3.5 mW. The holes formed in the recording disk upon irradiation with the laser beam had a good elliptical shape almost free of disorders in the edge line. The reflectivities in the opening areas and the non-opening areas of the recording disk in the readout of the information stored were examined in the same manner as in Example 13 except that the laser beam was applied through the substrate, and found to be 40% and 10%, respectively.

Another recording disk was prepared in substantially the same manner as described above except that a 500 Å-thick film of $Al_2O_3$ was deposited instead of the second mixture layer. Using this recording disk, recording and readout of information were carried out in the same manner as described above. The threshold intensity of a laser beam capable of forming a hole in the recording layer of the disk was 3.5 mW, and the holes formed upon irradiation with the laser beam had a good shape. The refrectivities in the opening areas and the non-opening areas of the recording disk in the readout of the information stored were 30% and 10%, respectively.

It was confirmed that reversal recording wherein the reflectivity in the opening areas was greater than that in the non-opening areas took place in the recording disks prepared in this Example by the application of the laser beam through the substrate, and that the metallic recording disk having the two mixture layers differing in thickness and packing ratio and respectively provided on the lower and upper sides of the metallic recording layer gave high contrast recording as compared with the recording disk having only the first or lower mixture layer.

EXAMPLE 16

In substantially the same manner as in Example 13, a 300 Å-thick co-evaporated mixture film of $Al_2O_3$ and Cr having a packing ratio of 0.2, a 300 Å-thick film of Bi, a 200 Å-thick co-evaporated mixture film of $Al_2O_3$ having a packing ratio of 0.7, and Cr and a 200 Å-thick film of $GeO_2$ were deposited in sequence on a polymethyl methacrylate disk as used in Example 13. Thus, a recording disk which has a first mixture layer of $Al_2O_3$ and Cr, a metallic recording layer of Bi, a second mixture layer of $Al_2O_3$ and Cr and a second stabilizing layer of $GeO_2$ was obtained.

The threshold intensity of a laser beam capable of producing a hole in the recording layer of the disk (sensitivity) was examined in the same manner as in Example 15, and found to be 4.5 mW. The holes formed in the recording disk upon irradiation with the laser beam had a good shape. The reflectivities in the opening areas and the non-opening areas of the recording disk in the readout of the information stored were examined in the same manner as in Example 15, and found to be 6% and 40%, respectively.

Another recording disk was prepared in the same manner as described above except that a 200 Å-thick film of $Al_2O_3$ was deposited instead of the second mixture layer of $Al_2O_3$ and Cr. Using this recording disk, recording and readout of information were carried out in the same manner as described above. The sensitivity of this recording disk was 4.5 mW. The reflectivities in the opening areas and the non-opening areas of this recording disk were 13% and 40%, respectively.

From the above results, it was confirmed that reversal recording did not take place in the recording disks prepared in this Example, and that the metallic recording disk having the two mixture layers differing in thickness and packing ratio and respectively provided on the lower and upper sides of the recording layer gave high contrast recording as compared with the recording disk having only the first mixture layer.

EXAMPLE 17

In substantially the same manner as in Example 13, a 100 Å-thick film of $Al_2O_3$, a 300 Å-thick co-evaporated mixture film of $SiO_2$ and Ni having a packing ratio of 0.5, a 200 Å-thick film of Pb, a 200 Å-thick film of Sn, a 300 Å-thick co-evaporated mixture film of $SiO_2$ and Ni having a packing ratio of 0.2 and 100 Å-thick film of $Al_2O_3$ were deposited in sequence on a polymethyl methacrylate disk as used in Example 13. Thus, a recording disk which has a first stabilizing layer of $Al_2O_3$, a first mixture layer of $SiO_2$ and Ni, a metallic recording layer comprised of a Pb layer and an Sn layer, a second mixture layer of $SiO_2$ and Ni and a second stabilizing layer of $Al_2O_3$ was obtained.

The threshold intensity of a laser beam capable of producing a hole in the recording layer of the disk (sensitivity) was examined in the same manner as in Example 15, and found to be 3.0 mW. The reflectivities in the opening areas and the non-opening areas of the recording disk in the readout of the information stored were also examined in the same manner as in Example 15, and found to be 35% and 10%, respectively.

Another recording disk according to the invention was prepared in the same manner as described above except that a 300 Å-thick film of $SiO_2$ was deposited instead of the second mixture layer of $SiO_2$ and Ni. Using this recording disk, recording and readout of information were carried out in the same manner as described above. The sensitivity of the recording disk was 3.0, which was the same as that of the recording disk described above. The reflectivities in the opening areas and the non-opening areas of the disk in the readout of the information stored was 25% and 10%, respectively.

From the above results, it was confirmed that the metallic recording disk having the two mixture layers differing only in packing ratio and respectively provided on the lower and upper sides of the recording layer gave high contrast recording as compared with the recording disk having only the first mixture layer.

EXAMPLE 18

In substantially the same manner as in Example 13, a 100 Å-thick film of $GeO_2$, a 300 Å-thick co-evaporated mixture film of $Sm_2O_3$ and Ag having a packing ratio of 0.2, a 250 Å-thick film of Bi, a 50 Å-thick film of In, a 100 Å-thick film of $GeO_2$ and a 300 Å-thick co-evaporated mixture film of $Sm_2O_3$ and Ag having a packing ratio of 0.5 were deposited in sequence on a polymethyl methacrylate disk as used in Example 13. Thus, a recording disk which has a first stabilizing layer of $GeO_2$, a first mixture layer of $Sm_2O_3$ and Ag, a metallic recording layer comprised of a Bi layer and an In layer, a second stabilizing layer of $GeO_2$ and a second mixture layer of $Sm_2O_3$ and Ag was obtained.

The threshold intensity of a laser beam capable of producing a hole in the recording layer of the disk (sensitivity) was examined in the same manner as in Example 15, and found to be 4.0 mW. The reflectivities in the opening areas and the non-opening areas of the recording disk in the readout of the information stored were also examined in the same manner as in Example 15, and found to be 8% and 40%, respectively.

Another recording disk was prepared in the same manner as described above except that a 300 Å-thick film of $Sm_2O_3$ was deposited instead of the second mixture layer of $Sm_2O_3$ and Ag. Using this recording disk, recording and readout of information were carried out in the same manner as described above. The sensitivity of this recording disk was 4.0 mW, which was the same as that of the recording disk described above. The reflectivities in the opening areas and the non-opening areas of this recording disk in the readout of the information stored were 15% and 40%, respectively.

From the above results, it was confirmed that the metallic recording disk having the two mixture layers differing only in packing ratio and respectively provided on the lower and upper sides of the metallic recording layer gave high contrast recording as compared with the recording disk having only the first mixture layer.

EXAMPLE 19

In substantially the same manner as in Example 1, a 300 Å-thick co-evaporated mixture film of $GeO_2$ and Cr having a packing ratio of 0.5, a 50 Å-thick film of $Sm_2O_3$, a 400 Å-thick film of Bi and a 300 Å-thick co-evaporated mixture film of $GeO_2$ and Cr having a packing ratio of 0.5 were deposited in sequence on a polymethyl methacrylate disk as used in Example 13. Thus, a recording disk which has a first mixture layer of $GeO_2$ and Cr, a first stabilizing layer of $Sm_2O_3$, a metallic recording layer of Bi and a second mixture layer of $GeO_2$ and Cr was obtained.

The threshold intensity of a laser beam capable of producing a hole in the recording layer of the disk (sensitivity) was examined in the same manner as in Example 15, and found to be 3.0 mW. The reflectivities in the opening areas and the non-opening areas of the recording disk in the readout of the information stored were also examined in the same manner as in Example 15, and found to be 35% and 10%, respectively.

Another recording disk was prepared in the same manner as described above except that a 300 Å-thick film of $GeO_2$ was deposited instead of the second mixture layer of $GeO_2$ and Cr. Using this recording disk, recording and readout of information were carried out in the same manner as described above. The sensitivity of the recording disk was 3.0 mW, which was the same as that of the recording disk described above. The reflectivities in the opening areas and the non-opening areas of the recording disk in the readout of the information stored were 30% and 10%, respectively.

From the above results, it was confirmed that, like a metallic recording disk having two mixture layers differing in packing ratio and respectively provided on the lower and upper sides of a metallic recording layer, the metallic recording disk having the two mixture layers each having the same thickness and the same packing ratio and respectively provided on the lower and upper sides of the metallic recording layer gave high contrast recording as compared with the recording disk having only the first mixture layer. Further, the metallic recording disk having the two mixture layers could be compared advantageously in shape of a hole formed upon irradiation of the laser beam with the recording disk having only the first mixture layer.

EXAMPLE 20

In substantially the same manner as in Example 13, a 200 Å-thick co-evaporated mixture film of $TiO_2$ and Cr having a packing ratio of 0.7, a 50 Å-thick film of $GeO_2$, a 350 Å-thick film of Bi, a 50 Å-thick film of Pb, a 50

Å-thick film of $GeO_2$ and a 400 Å-thick co-evaporated mixture film of $TiO_2$ and Cr having a packing ratio of 0.2 were deposited in sequence on a polymethyl methacrylate disk as used in Example 13. Thus, a recording disk which has a first mixture layer of $TiO_2$ and Cr, a first stabilizing layer of $GeO_2$, a metallic recording layer comprised of a Bi layer and a Pb layer, a second stabilizing layer of $GeO_2$ and a second mixture layer of $TiO_2$ and Cr was obtained.

The threshold intensity of a laser beam capable of producing a hole in the recording layer of the disk (sensitivity) was examined in the same manner as in Example 15, and found to be 3.3 mW. The reflectivities in the opening areas and the non-opening areas of the recording disk in the readout of the information stored were also examined in the same manner as in Example 15, and found to be 38% and 10%, respectively.

Another recording disk was prepared in the same manner as described above except that the second mixture layer was changed in packing ratio from 0.2 to 0.7, which was the same as that of the first mixture layer. Using this recording disk, recording and readout of information were carried out in the same manner as described above. The sensitivity of this recording disk was 3.8 mW. The reflectivities in the opening areas and the non-opening areas of this recording disk in the readout of the information stored were 30% and 10%, respectively. A slight decrease in sensitivity of this disk against the disk with the two mixture layers was believed to be due to the increased rate of heat transfer from the metallic recording layer to the second mixture layer owing to the increased packing ratio of the second mixture layer.

From the above results, it was found that it is prefered for high contrast reversal recording by laser beam ablation through a transparent substrate that a recording disk be provided with two mixture layers differing in packing ratio in such a way that a mixture layer having a higher packing ratio is on the same side of the metallic recording layer as is to be irradiated with a laser beam and the other having a lower packing ratio is on the opposite side.

EXAMPLE 21

A recording disk was prepared according to substantially the same procedures as in Example 1. Specifically, a 200 Å-thick mixture film of $Al_2O_3$ and Ge having a packing ratio of 0.5 was co-evaporation-deposited as a mixture layer on a transparent polymethyl methacrylate disk as used in Example 1. A 100 Å-thick film of $Sm_2O_3$ was evaporation-deposited as a first stabilizing layer on the deposited $Al_2O_3$-Ge film. Then, Sb and Bi were evaporation-deposited in sequence as a metallic recording layer on the deposited $Sm_2O_3$ film to form a 400-Å-thick film of an Sb-Bi alloy containing 20% Sb in number of atoms. Finally, a 50 Å-thick film of $GeO_2$ was evaporation-deposited as a second stabilizing layer on the deposited Sb-Bi alloy film.

Using the recording disk thus prepared, recording and readout of information were carried out in the same manner as in Example 13. Elliptical holes of about 1μ in length of minor axis were formed in the area where the metallic recording layer was irradiated with the laser beam. The holes formed had no disordered edge line. The threshold intensity of a laser beam capable of producing a hole in the recording layer of the disk (sensitivity), examined at the surface of the recording disk, was 4 mW. With respect to the recording disk, a C/N ratio was examined by means of a spectrum analyzer to which a 1 MHz standard signal had been given, and found to be 45 dB.

Another recording disk was prepared in the same manner as described above except that the metallic recording layer of Sb-Bi was changed in Sb content from 20% to 8% in number of atoms. In the case of this recording disk, the sensitivity and the C/N ratio examined in the same manner as described above were 4 mW and 40 dB, respectively. With respect to C/N ratio, the recording disk having the metallic recording layer containing 8% Sb in number of atoms was somewhat inferior to the recording disk having the metallic recording layer containing 20% Sb in number of atoms.

EXAMPLE 22

A recording disk (22-A) was prepared according to substantially the same procedures as in Example 1. Specifically, a 300 Å-thick co-evaporated $GeO_2$-Cr mixture film with a packing ratio of 0.3 and a 50 Å-thick film of $La_2O_3$ were deposited in sequence on a polymethyl methacrylate disk as used in Example 1. Then, Bi, Sn and Sb were evaporation-deposited in sequence on the deposited $La_2O_3$ film so that a 350 Å-thick alloyed Bi-Sn-Sb metallic recording layer whose Sb content was 25% in number of atoms and whose Bi content was 70% in number of atoms could be formed. Finally, a 50 Å-thick film of $GeO_2$ was evaporation-deposited on the deposited Bi-Sn-Sb alloy film.

Another recording disk (22-B) was prepared in the same manner as described above except that the Sb content and Bi content of the Bi-Sn-Sb metallic recording layer were varied to be 5% and 70% in number of atoms, respectively.

Still another recording disk (22-C) was also prepared in the same manner as described above except that the Sb content and Bi content of the Bi-Sn-Sb metallic recording layer were varied to be 25% and 40% in number of atoms, respectively.

With respect to each recording disk, the threshold intensity of a laser beam capable of producing a hole in the recording layer of the disk (sensitivity) and the C/N ratio were examined in the same manner as in Example 21. In the case of the recording disk (22-A), the sensitivity and the C/N ratio were 3.8 mW and 47 dB, respectively. In the case of the recording disk (22-B), the sensitivity and the C/N ratio were 3.5 mW and 39 dB, respectively. In the case of the recording disk (22-C), the sensitivity and the C/N ratio were 4.5 mW and 38 dB, respectively. Thus, the recording disk (22-A) had the best recording characteristics.

EXAMPLE 23

A recording disk (23-A) was prepared according to substantially the same procedures as in Example 1. Specifically, a 150 Å-thick co-evaporated $Al_2O_3$-Sn mixture film with a packing ratio of 0.6, a 70 Å-thick film of $Y_2O_3$, a 300 Å-thick co-evaporated Bi-Sb alloy film with an Sb content of 18% in number of atoms and a 50 Å-thick film of $Al_2O_3$ were deposited in sequence on a polymethyl methacrylate disk as used in Example 1.

A recording disk (23-B) was prepared in the same manner as described above except that the Sb content of the Bi-Sb metallic recording layer was varied to be 35% in number of atoms.

With respect to each recording disk, the threshold intensity of a laser beam capable of producing a hole in the recording layer of the disk (sensitivity) and the C/N ratio were examined in the same manner as in Example 21. In the case of the recording disk (23-A), the sensitivity and the C/N ratio were 4.2 mW and 44 dB, respectively. In the case of the recording disk (23-B), the sensitivity and the C/N ratio were 5.0 mW and 35 dB, respectively. Thus, the recording disk (23-A) had better recording characteristics than the recording disk (23-B).

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A recording material possessing a high sensitivity and a high S/N ratio for making an information recording in a metallic recording layer comprising:
    (a) a substrate;
    (b) a metallic recording layer supported by said substrate, said metallic recording layer comprising at least one member selected from the group consisting of In, Bi, Sn, Zn, Pb, Mg, Au, Ge, Ga, Tl, Cd, Sb, Rh, Se, Te, Al and alloys thereof; and
    (c) at least one mixture layer comprising at least one metallic compound selected from the group consisting of $Al_2O_3$, $ZrO_2$, $Cr_2O_3$, $GeO_2$, $SiO_2$, $SnO_2$, $Bi_2O_3$, $As_2O_3$, $Sb_2O_3$, $Ta_2O_3$, $Sm_2O_3$, $TiO_2$, $CeO_2$, $La_2O_3$ and $Dy_2O_3$ and at least one metal selected from the group consisting of Al, Si, Sc, Ti, V, Cr, Mn, Fe, Co, Ni, Cu, Zn, Ga, Ge, As, Sr, Y, Zr, Nb, Tc, Ru, Rh, Pd, Ag, In, Sn, Sb, La, Hf, Ta, Re, Ir, Tl, Pb, Bi, Dy, Er, Gd, Nd, Pr, Sm, Mo, Au, Pt, W, Se and Te, wherein the volume percentage of said metal in said mixture layer is in the range of 10 to 80%, said mixture layer being provided on at least one side of said metallic recording layer,
    but if said mixture layer is provided only on the side of said metallic recording layer adjacent said substrate, then said recording material is further provided with at least one stabilizing layer of a metallic compound on at least the side of said metallic recording layer remote from said substrate,
    said metallic recording layer and said mixture layer having a positional relationship such that said information is recorded in said metallic recording layer with irradiation from a laser beam through said mixture layer,
    thereby causing only said metallic recording layer to be adapted to be imaged upon irradiation with said laser beam.

2. A recording material according to claim 1, wherein a mixture layer is provided on said metallic recording layer remote from said substrate, and a stabilizing layer of a metal oxide is provided between said substrate and said metallic recording layer.

3. A recording material according to claim 2, which further comprises a stabilizing layer of a metallic compound provided either between said metallic recording layer and said remotely positioned mixture layer or on said remotely positioned mixture layer.

4. A recording material according to claim 2, wherein said metal oxide stabilizing layer of comprises at least one oxide of metal selected from Be, B, Mg, Al, Si, Ga, Ca, Sc, Ti, V, Cr, Mn, Fe, Co, Ni, Cu, Zn, Ge, As, Sr, Y, Zr, Nb, Te, Ru, Rh, Pd, Ag, In, Sn, Sb, Ba, La, Hf, Ta, Re, Ir, Tl, Pb, Bi, Dy, Er, Gd, Nd, Pr and Sm.

5. A recording material according to claim 1, wherein said at least one mixture layer is provided between said substrate and said metallic recording layer, and a stabilizing layer is provided on the side of said metallic recording layer remote from said substrate.

6. A recording material according to claim 5, which further comprises a stabilizing layer of a metal compound provided either between said substrate and said mixture layer or between said mixture layer and said metallic recording layer.

7. A recording material according to claim 6, wherein said metal oxide stabilizing layer comprises at least one oxide of a metal selected from Be, B, Mg, Al, Si, Ga, Ca, Sc, Ti, V, Cr, Mn, Fe, Co, Ni, Cu, Zn, Ge, As, Sr, Y, Zr, Nb, Te, Ru, Rh, Pd, Ag, In, Sn, Sb, Ba, La, Hf, Ta, Re, Ir, Tl, Pb, Bi, Dy, Er, Gd, Nd, Pr and Sm.

8. A recording material according to claim 1, which comprises two mixture layers of a metallic compound and a metal respectively provided on both the upper and lower sides of said metallic recording layer.

9. A recording material according to claim 8, which further comprises a stabilizing layer of a metal oxide provided either between said substrate and said lower mixture layer or between said lower mixture layer and said metallic recording layer.

10. A recording material according to claim 9, which further comprises a stabilizing layer of a metallic compound provided either between said metallic recording layer and said upper mixture layer or on said upper mixture layer.

11. A recording material according to claim 9, wherein said metal oxide stabilizing layer comprises at least one oxide of a metal selected from Be, B, Mg, Al, Si, Ga, Ca, Sc, Ti, V, Cr, Mn, Fe, Co, Ni, Cu, Zn, Ge, As, Sr, Y, Zr, Nb, Te, Ru, Rh, Pd, Ag, In, Sn, Sb, Ba, La, Hf, Ta, Re, Ir, Tl, Pb, Bi, Dy, Er, Gd, Nd, Pr and Sm.

12. A recording material according to claim 8, which further comprises a stabilizing layer of a metallic compound provided either between said metallic recording layer and said upper mixture layer or on the said upper mixture layer.

13. A recording material according to claim 1, wherein when a stabilizing layer of a metallic compound is required on the side of said metallic recording layer remote from said substrate, said metallic compound will comprise at least one member selected from the group consisting of oxides, nitrides and fluorides of a metal selected from Be, B, Mg, Al, Si, Ga, Ca, Sc, Ti, V, Cr, Mn, Fe, Co, Ni, Cu, Zn, Ge, As, Sr, Y, Zr, Nb, Te, Ru, Rh, Pd, Ag, In, Sn, Sb, Ba, La, Hf, Ta, Re, Ir, Tl, Pb, Bi, Dy, Er, Gd, Nd, Pr and Sm.

* * * * *

UNITED STATES PATENT AND TRADEMARK OFFICE
CERTIFICATE OF CORRECTION

PATENT NO. : 4,461,807
DATED : July 24, 1984
INVENTOR(S) : K. Mori et al

It is certified that error appears in the above-identified patent and that said Letters Patent are hereby corrected as shown below:

IN THE CLAIMS:

Claim 4, line 2, delete "of"

Claim 4, line 3, after "of" insert -- a --

Claim 6, lines 2 and 3, change "compound" to -- oxide --

Signed and Sealed this

Twelfth Day of February 1985

[SEAL]

Attest:

DONALD J. QUIGG

Attesting Officer     Acting Commissioner of Patents and Trademarks